(12) United States Patent
Yokoyama et al.

(10) Patent No.: US 8,179,863 B2
(45) Date of Patent: May 15, 2012

(54) WIRELESS COMMUNICATION APPARATUS AND METHOD

(75) Inventors: Masahiro Yokoyama, Kawasaki (JP); Hitoshi Mizusawa, Kawasaki (JP); Yusuke Furuumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 535 days.

(21) Appl. No.: 12/409,651

(22) Filed: Mar. 24, 2009

(65) Prior Publication Data
US 2009/0303946 A1 Dec. 10, 2009

(30) Foreign Application Priority Data
Jun. 10, 2008 (JP) .................... 2008-152273

(51) Int. Cl.
*H04W 4/00* (2009.01)
(52) U.S. Cl. ........................................ 370/332
(58) Field of Classification Search .......... 370/332, 370/329, 330, 341, 342, 338, 349, 431, 436, 370/437, 471, 395.3
See application file for complete search history.

(56) References Cited

U.S. PATENT DOCUMENTS

| | | | |
|---|---|---|---|
| 6,850,771 B2 * | 2/2005 | Malladi et al. | 455/522 |
| 7,313,400 B2 * | 12/2007 | Moon et al. | 455/450 |
| 2008/0165710 A1 | 7/2008 | Parts et al. | |

FOREIGN PATENT DOCUMENTS

| | | |
|---|---|---|
| JP | 2003-283456 | 10/2003 |
| JP | 2005-027294 | 1/2005 |

OTHER PUBLICATIONS

Extended European Search Report with Written Opinion for corresponding European Patent Application No. 09155927.8, dated Nov. 23, 2009.
Jing Zhang et al.; "Adaptive Frame Structure Design and Adaptation Control Mechanism in MIMO-OFDM Systems"; Communications and Networking in China, 2007.; CHINACOM '07. Second International Conference on, IEEE, Piscataway, NJ, USA; pp. 1137-1141, XP031238046; Aug. 22, 2007 [Ref: EESR dated Nov. 23, 2009].
Cheong-Hwan Kim et al.; "Adaptive Pilot Signaling in the Uplink of OFDM-Based Wireless Systems"; 16th IST Mobile and Wireless Communications Summit, 2007 IEEE Piscataway, NJ, USA; pp. 1-5, XP031132478; Jul. 1, 2007 [Ref.: EESR dated Nov. 23, 2009].
Toshiba; "Downlink Pilot Structure for Evolved UTRA"; 3GPP Draft; R1-051054, 3rd Generation Partnership Project (3GPP), Mobile Competence Centre; 650, Route Des Lucioles; F-06921 Sophia-Antipolis Cedex; France; vol. RAN WG1, No. San Diego, USA; 20051005; XP050100671; Oct. 5, 2005; [Ref.: EESR dated Nov. 23, 2009].
3GPP TS36.211 V8.2.0 (Mar. 2008).

* cited by examiner

*Primary Examiner* — Chi Pham
*Assistant Examiner* — Alexander Boakye
(74) *Attorney, Agent, or Firm* — Myers Wolin, LLC

(57) ABSTRACT

A wireless communication apparatus comprises a determination unit to determine whether to increase the number of reference signals to be included in a downlink signal based on an uplink signal. The wireless communication apparatus further comprises a mapping unit to map reference signals based on a determination made by the determination unit.

11 Claims, 14 Drawing Sheets

FIG.12

| CONTENT | NUMBER OF BITS | OPERATION |
|---|---|---|
| REQUEST TO INCREASE NUMBER OF REFERENCE SIGNALS | 1bit | 0: DO NOT INCREASE NO. OF REFERENCE SIGNALS<br>1: INCREASE NO. OF REFERENCE SIGNALS |

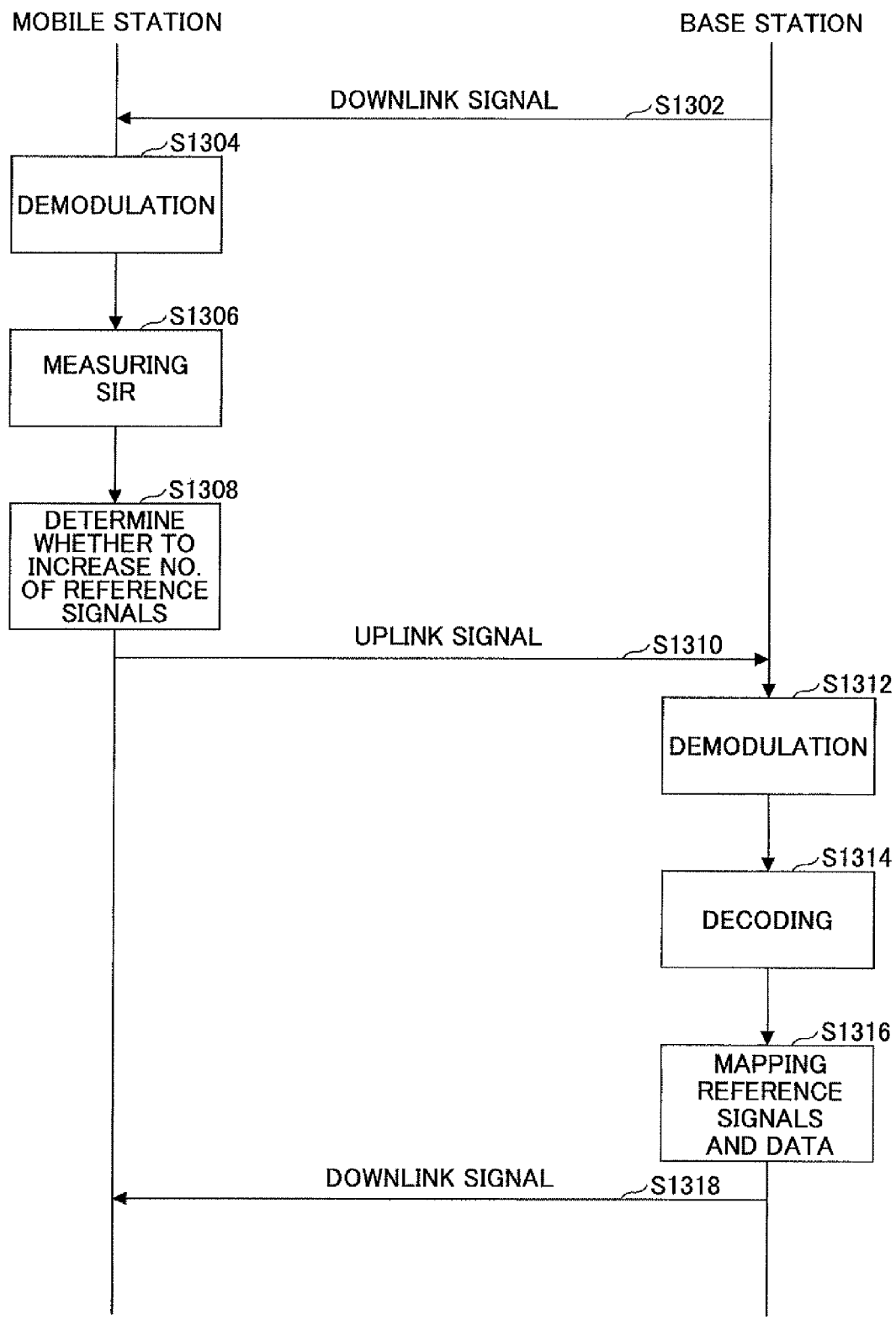

WIRELESS COMMUNICATION APPARATUS AND METHOD

CROSS-REFERENCE TO RELATED APPLICATIONS

This application is based on and claims the benefits of priority of the prior Japanese Patent Application No. 2008-152273, filed on Jun. 10, 2008, the contents of which are incorporated herein by reference.

FIELD

The present invention relates to a mobile communication system for packet exchange services.

CROSS-REFERENCE TO RELATED APPLICATION

This application is based upon and claims the benefit of priority of the prior Japanese Patent Application No. 2008-152273, filed on Jun. 10, 2008, the entire contents of which are incorporated herein by reference.

BACKGROUND

The wireless access scheme for the next-generation mobile communication system to the 3rd generation is currently discussed by 3rd Generation Partnership Project (3GPP), for example. The next-generation mobile communication system may be referred to as Long Term Evolution (LTE). It may also refer to as Evolved UTRA and UTRAN.

A mobile communication system in which LTE is used as its wireless access scheme does not use dedicated channel resource allocation, which has been used, for example, for Wideband Code Division Multiple Access (W-CDMA). For the mobile communication system in which LTE is used as its wireless access scheme, specification is discussed on the basis of resource allocation by means of shared channel. The "shared channel" is a radio channel shared by multiple users. This allows limited radio resources to be utilized efficiently.

[Non patent document 1] 3GPP TS 36.211 V.8.2.0 March 2008

For the wireless communication system in which LTE is used as its wireless access scheme, a base station (BS) transmits downlink signals including a reference signal (RS). The reference signal may be mapped as depicted, for example, in FIG. 1. FIG. 1 illustrates an exemplary mapping of reference signals. In FIG. 1, the abscissa axis indicates frequency and the ordinate axis indicates time. For example, one radio frame includes ten subframes. One subframe includes two slots. One slot may include six or seven OFDM symbols. FIG. 1 illustrates that each subframe has reference signals for unicast mapped thereto with six-subcarrier interval (one reference signal in every six subcarriers). FIG. 1 also illustrates that each slot has reference signals for MBMS mapped thereto with two-subcarrier interval (one reference signal in every two subcarriers). Besides reference signals for unicast and reference signals for MBMS, resource elements (RE) mapped to the frame may include data (data symbols). One resource element may be a radio resource with one OFDM symbol and one subcarrier.

A mobile station may perform channel estimation based on the reference signals included in the downlink signals transmitted from the base station (BS).

The reference signals, however, may be mapped without taking radio environment into account. Consequently, if demodulation is performed based on such reference signals, modulation accuracy may be degraded. FIG. 2 illustrates a relation between subcarriers and their Error Vector Magnitude (EVM) in a mobile station, the subcarriers being demodulated from received signal via an antenna. The subcarriers may be at a base band frequency. FIG. 2 depicts that the EVM degrades more at both edges of the band. As a result, reception performance also degrades.

For example, the radio unit of the reception unit in the mobile station may filter out signals from other users located near the mobile station with a baseband filter. The baseband filter may include a Low Pass Filter (LPF). If the filter slope (attenuation factor) of the baseband filter is to be steep (increased), the radio unit may be larger. That means that the filter slope may need to be reduced for smaller circuit of the radio unit. In the case of reduced filter slope, the baseband filter may cut a portion of band (hereinafter, may be referred to as a signal band) in which the signal is transmitted.

For example, a Wideband Code Division Multiple Access (W-CDMA) system uses a 3.84 MHz wide signal band. In this case, a wide gap (hereinafter, referred to as adjacent channel gap) may be reserved between adjacent signal bands. Thus, for a W-CDMA system, the signal band is seldom cut even in the case of reduced filter slope of the baseband filter. Consequently, filter characteristics only affects the modulation accuracy (EVM) to a small extent.

On the other hand, a LTE system uses 4.5 MHz wide signal band. It uses narrower adjacent channel gap than the W-CDMA system does. Thus, for the LTE system, the signal band may be cut in the case of reduced filter slope of the baseband filter. Consequently, filter characteristics affects the modulation accuracy (EVM) to a great extent. For example, as illustrated in FIG. 3, a baseband filter cuts the edge of signal band for a user (1). In FIG. 3, a signal portion that is cut by the baseband filter is indicated by shaded area. As a result, assuming the relation between subcarriers and their EVMs as illustrated in FIG. 2, the modulation accuracy of a signal may appear to be degraded due to the effect of the baseband filter illustrated in FIG. 3 regardless of the actual reception condition of the signal which is good. A reception unit transmits the reception quality of received signal from a transmission unit, to the transmission unit.

For example, a reception unit transmits the reception quality as a Channel Quality Indicator (CQI). For example, a mobile station with a receiver unit generates CQI based on downlink signal transmitted from the transceiver unit of a base station, and transmits the CQI to the base station. The base station determines communication condition with the mobile station on the basis of the transmitted CQI from the mobile station. If the base station performs scheduling based on the degraded portion of reception quality in the signal band illustrated in FIG. 3, the base station may allocate less radio resources to the mobile station than otherwise allocated based on true reception quality. The true reception quality is a reception quality without the effect of the baseband filter. For example, if the based station receives a CQI corresponding to a band portion including the center of signal band and another CQI corresponding to another band portion including the edge of the signal band, the base station may communicate with the mobile station based on the CQI corresponding to the band portion including the edge of the signal band. This is because the CQI corresponding to the band portion including the edge of the signal band appears to indicate degraded reception characteristics due to the effect of baseband filter characteristics. Consequently, the mobile station may not communicate with the base station at an otherwise-available transmission rate (throughput).

SUMMARY

According to an aspect of the invention, a wireless communication apparatus includes:

a determination unit to determine whether to increase the number of reference signals to be included in a downlink signal based on an uplink signal; and a mapping unit to map the reference signals based on a determination made by the determination unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a schematic diagram illustrating the operation an exemplary mobile station according to an embodiment;

FIG. 14 is a flow diagram illustrating the operation of an exemplary wireless communication system according to an embodiment;

EMBODIMENTS

Preferred exemplary embodiments are now described in detail with reference to accompanied drawings.

Components of similar functionalities are designated by a similar reference symbol throughout the accompanied drawings, and their repetitive description may be omitted.

[First Exemplary Embodiment]

Figure 4:
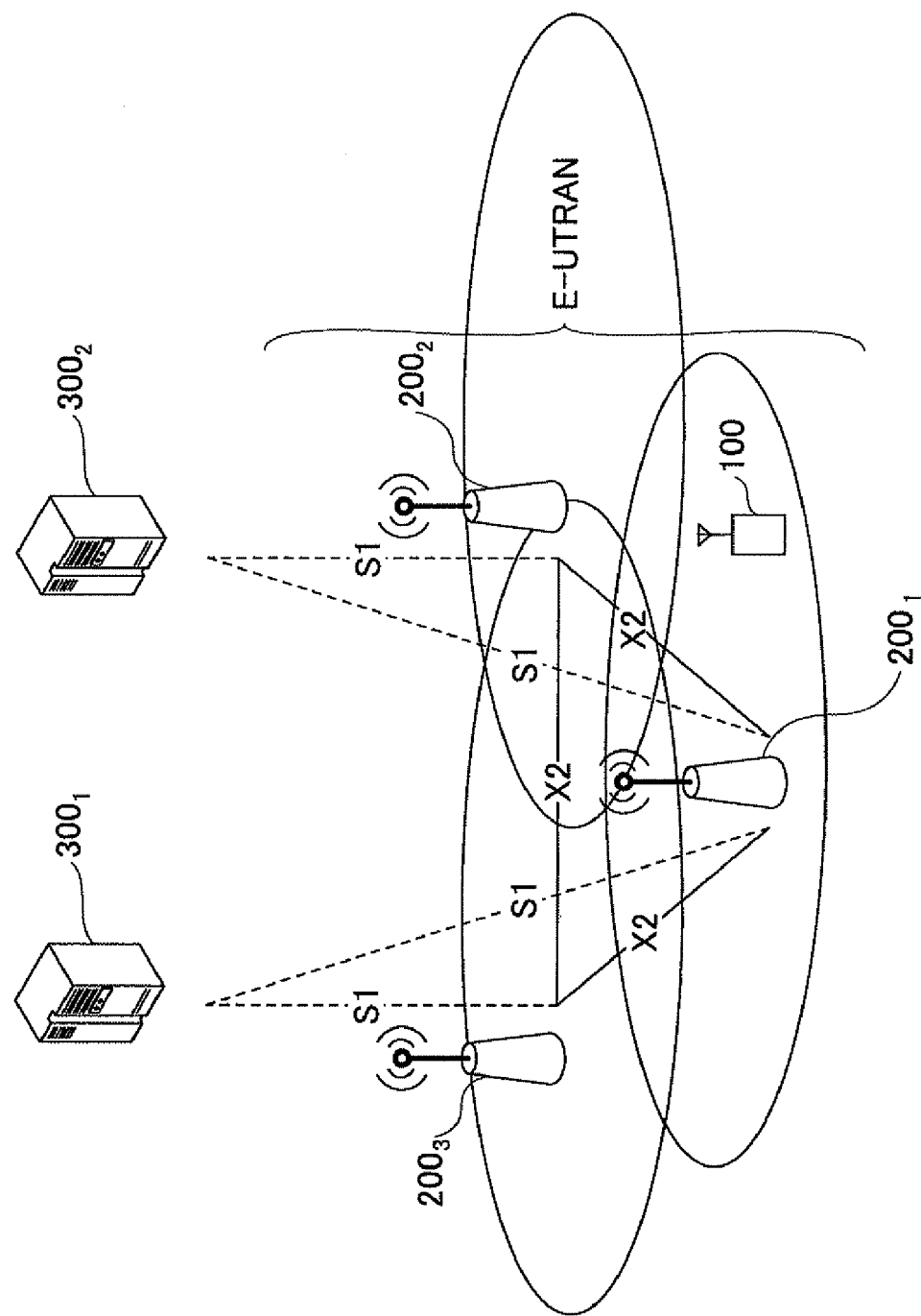
FIG. 4 is a schematic diagram illustrating an exemplary wireless communication system according to an embodiment.

Referring now to FIG. 4, an exemplary mobile communication system in which a wireless communication apparatus according to a first exemplary embodiment may be used. The wireless communication apparatus may be included in a base station. Alternatively, the wireless communication apparatus may be included in a mobile station.

The mobile communication system may transmit user data via a shared channel. According to another embodiment, the mobile communication system may transmit user data via a common channel. According to yet another embodiment, the mobile communication system may transmit user data via both a shared channel and a common channel. For the mobile communication system according to the first exemplary embodiment, a base station (BS) transmits downlink signals including a reference signal (RS). The reference signals may also be called as pilot signals. The reference signals may include predefined symbol patterns. An example of such mobile communication systems with the above-described features may include a Long Term Evolution (LTE) mobile communication system. The following description is made for a LTE mobile communication system. It would be appreciated that the present embodiment may be applicable to any mobile communication system with the above-describe features. The LTE mobile communication system may be referred to as Evolved UTRA and UTRAN.

The mobile communication system may include a mobile station (MS) 100. The mobile communication system may also include a base stations (eNode B or eNB) 200, namely 2001, 2002, and 2003. There may be Mobility Management Entity/Serving-Gateway (MME/S-GW) 300, namely 3001 and 3002 at a higher level than that of eNB 200.

As illustrated in FIG. 4, S1 designates the interface between an eNB 200 and a MME/S-GW 300. In addition, X2 designates the interface between eNBs 200.

The eNB 200 performs call control and radio control. The eNB 200 also has Radio Resource Control (RRC) capability. The eNB 200 includes S1-Application (S1-AP) and X2-Application (X2-AP).

The MME-S-GW 300 may terminate Non-Access Stratum (NAS) and manages mobile stations in idle state and System Architecture Evolution (SAE) bearer resources.

The mobile communication system uses Orthogonal Frequency Division Multiple Access (OFDMA) scheme for uplink and Single-Carrier Frequency Division Multiple Access (SC-FDMA) scheme for downlink. The OFDMA scheme divides a frequency band into multiple narrow frequency bands (subcarriers) to transmit data using the multiple subcarriers. For the OFDMA scheme, the multiple subcarriers may be densely arranged in a frequency band, partially overlapping without mutual interference, which enables high speed transmission of data, resulting in the increase in frequency utilization efficiency. The SC-FDMA scheme divides a frequency band into multiple narrower frequency bands, which allows a different terminal (mobile station) to use a different narrower frequency band for transmission of data, resulting in less interference between terminals (mobile stations).

Figure 5:
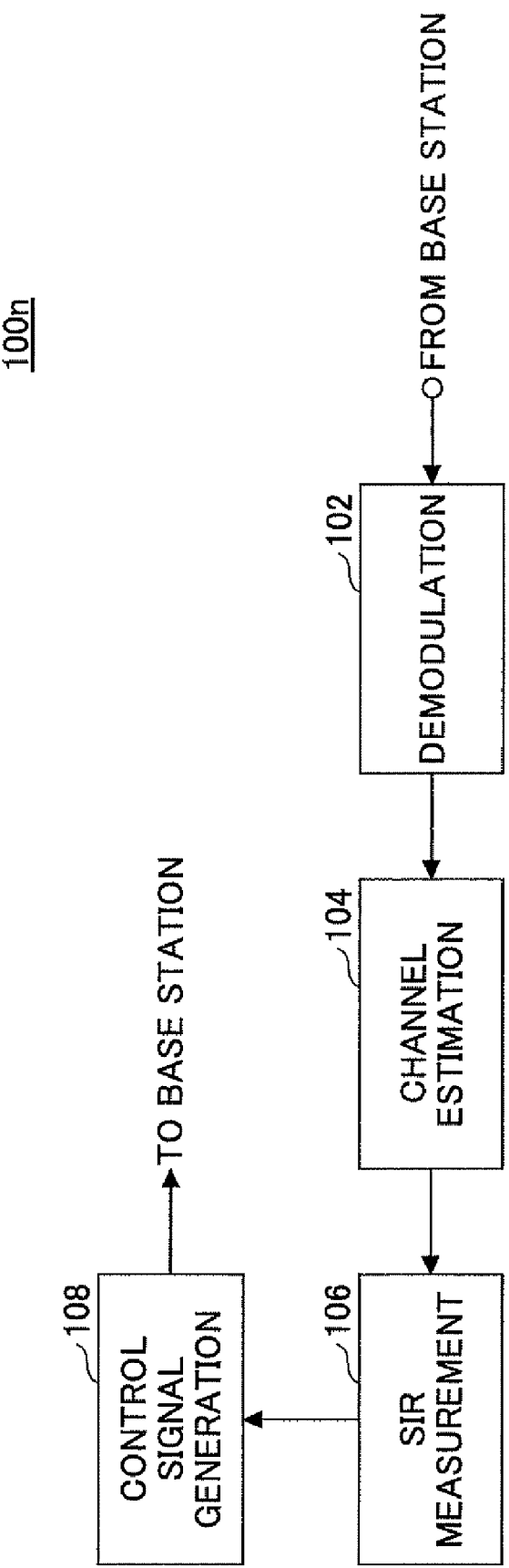
FIG. 5 is a block diagram illustrating an exemplary mobile station according to an embodiment.

Referring now to FIG. 5, an exemplary mobile station apparatus 100n is described.

The mobile station apparatus 100n according to the present exemplary embodiment includes a demodulation unit 102. The demodulation unit 102 demodulates downlink signals from the eNB 200. The demodulation unit 102 inputs the demodulated downlink signals into a channel estimation unit 104.

The mobile station apparatus 100n according to the present exemplary embodiment further includes the channel estimation unit 104. The channel estimation unit 104 uses the demodulated downlink signals from the demodulation unit 102 to perform channel estimation. The channel estimation unit 104 may use, for example, reference signals included in the demodulated downlink signals to perform channel estimation. The mobile station 100n may decode the signal in dependence on the channel estimation. The channel estimation unit 104 sends the demodulated downlink signals to a Signal-to-Interference-Ratio (SIR) measurement unit 106, which is described in more details below.

The channel estimation unit 104 may retain a channel estimation value estimated using increased reference signals, which are described in more detail below. In the case in which the channel estimation is made on a subframe using non-increased reference signals, the channel estimation unit 104 may use the retained channel estimation value. A subframe with increased reference signals may reduce data that can be mapped to the subframe. Another subframe with non-increased reference signals does not reduce data that can be mapped to the other subframe. The other subframe with non-increased reference signals can use the retained channel estimation value, which prevents transmission rate to be reduced and allows increased reception characteristics.

The mobile station apparatus 100n according to the present exemplary embodiment further includes a Signal-to-Interference-Ratio (SIR) measurement unit 106. The SIR measurement unit 106 measures the reception quality of downlink signals. The SIR measurement unit 106 may use the reference signals included in the downlink signals to measure the reception quality. The SIR measurement unit 106 sends the measured Signal to Interference Ratio (SIR) to a control signal generation unit 108, which is described in more detail below. The SIR measurement unit 106 may further use the measured SIR to derive Channel Quality Indicator (CQI), that is, information indicating the quality of channel. In this case, the SIR measurement unit 106 may send the derived CQI, instead of the measured SIR, to the control signal generation unit 108.

The mobile station apparatus 100n according to the present exemplary embodiment further includes the control signal generation unit 108. The control signal generation unit 108 generates control signals including the SIR inputted thereto. The control signal generation unit 108 may generate control signals including the derived CQI. The generated control signals are transmitted to the eNB 200.

Figure 6:
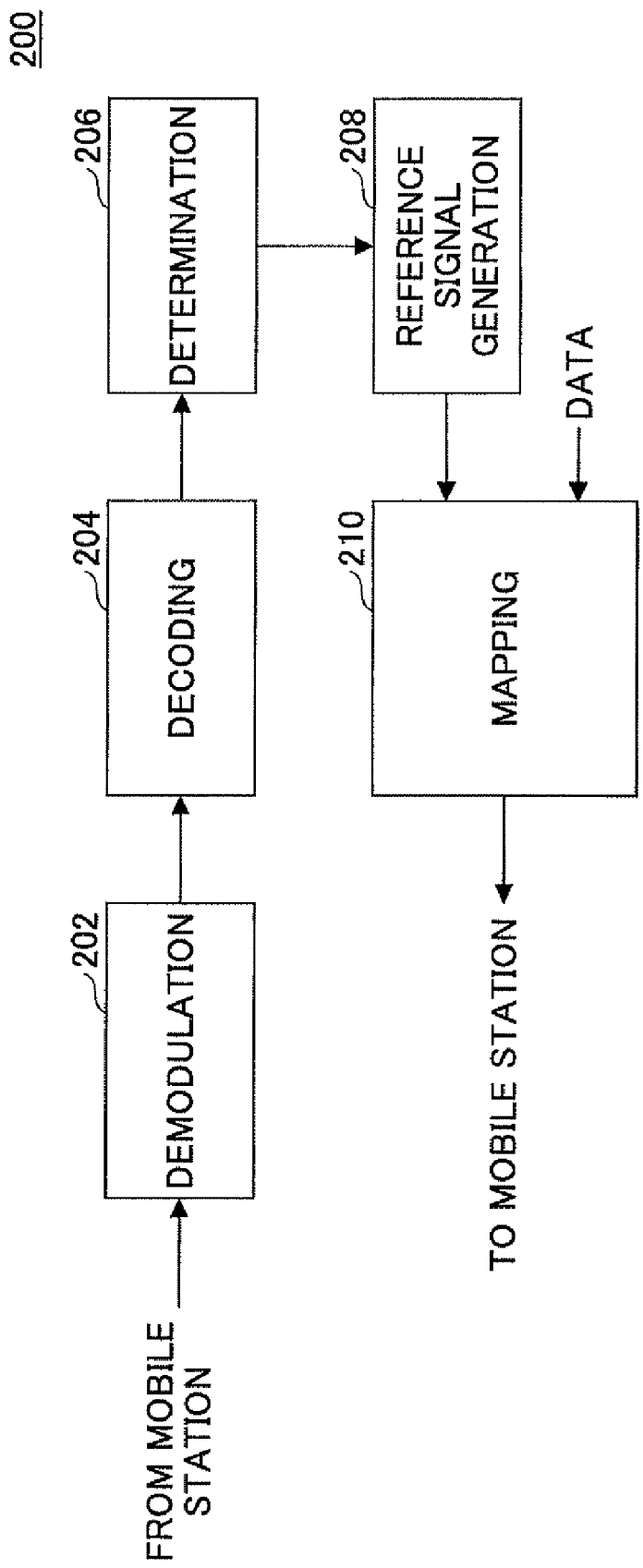
FIG. 6 is a block diagram illustrating an exemplary base station according to an embodiment.

Referring now to FIG. 6, an exemplary base station apparatus 200 is described.

The base station apparatus 200 according to the present exemplary embodiment includes a demodulation unit 202. The demodulation unit 202 receives uplink signals transmitted from the mobile station 100n. The demodulation unit 202 demodulates the uplink signals inputted thereto. The demodulation unit 202 inputs the demodulated uplink signals into a decoding unit 204.

The base station apparatus 200 according to the present exemplary embodiment further includes the decoding unit 204. The decoding unit 204 decodes the demodulated uplink signals inputted from the demodulation unit 202. The uplink signal may include the SIR and/or CQI of downlink signals measured or derived at the mobile station 100n. The decoding unit 204 inputs the decoded uplink signals into a determination unit 206.

The base station apparatus 200 according to the present exemplary embodiment further includes a determination unit 206. The determination unit 206 determines whether the reference signals included in the downlink signals are to be increased in number. The determination unit 206 may determine whether to increase the number of reference signals, for example, based on the SIR and/or CQI included in the uplink signal. The determination unit 206 determines whether the reference signals are to be increased in number, for example, based on the number of repeated transmission of downlink signal. The determination unit 206 sends the determination of whether to increase the number of reference signals to a reference signal generation unit 208.

If the determination unit 206 determines that the reception quality would not improve with the increased number of reference signals by comparing the inputted SIR with a specific threshold value, the inputted SIR being lower than the specific threshold value, the determination unit 206 may determine that the number of reference signals is not to be increased. Additionally or alternatively, if the determination unit 206 determines that the reception quality would not improve with the increased number of reference signals by comparing the inputted CQI with a specific threshold value, the inputted CQI being lower than the specific threshold value, the determination unit 206 may determine that the number of reference signals is not to be increased.

Figure 7:
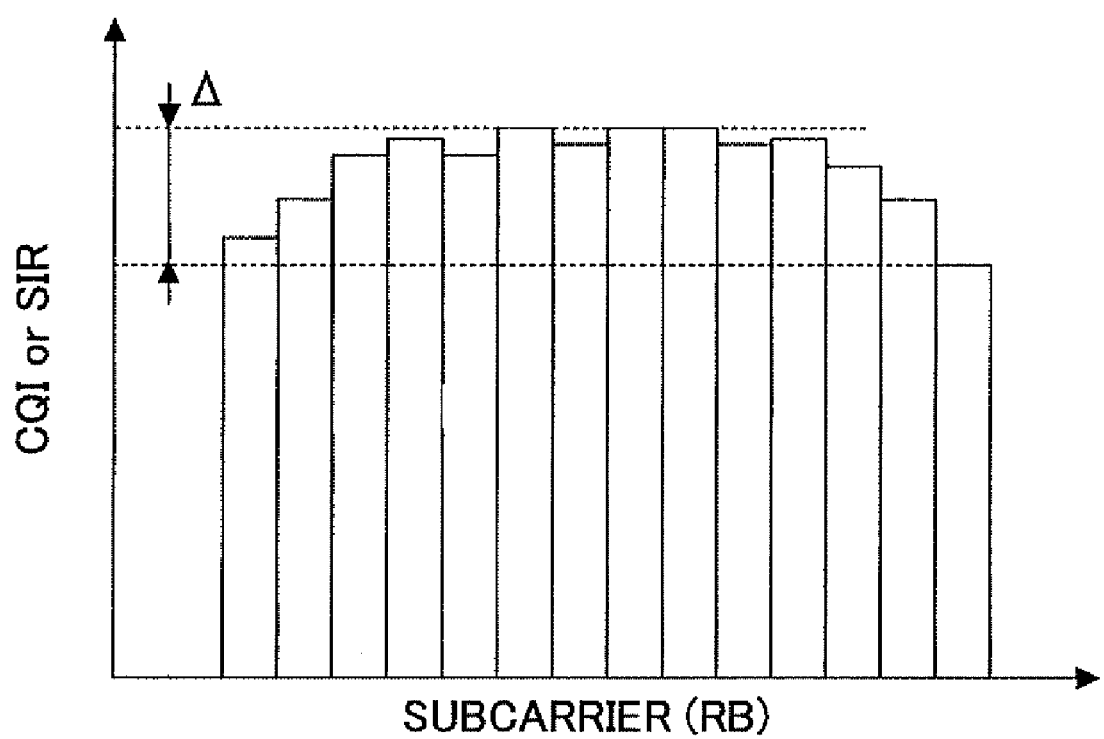
FIG. 7 is a schematic diagram illustrating the operation an exemplary base station according to an embodiment.

If the determination unit 206 determines that the reception quality would improve with the increased number of reference signals by comparing the inputted SIR with a specific threshold value, the inputted SIR being equal to or higher than the specific threshold value, the determination unit 206 may determine to perform the following operation. The determination unit 206 determines the difference (delta) between the maximum and minimum of the inputted SIR as depicted in FIG. 7. If the determination unit 206 determines that the difference is not due to the effect of filters by comparing the difference with a specific threshold value, the difference being less than the specific threshold value, the determination unit 206 does not determine to increase the number of reference signals. Meanwhile, if the determination unit 206 determines that the difference is due to the effect of filters by comparing the difference with a specific threshold value, the difference being equal to or more than the specific threshold value, the determination unit 206 determines to increase the number of reference signals. In this way, the determination unit 206 determines that the number of reference signals is to be increased if the reception quality is expected to improve with the increased number of reference signals. The determination unit 206 determines that the number of reference signals is to be increased if the SIR is degraded due to the effect of filter characteristics.

If the determination unit 206 determines that the reception quality would improve with the increased number of reference signals by comparing the inputted CQI with a specific threshold value, the inputted CQI being equal to or higher than the specific threshold value, the determination unit 206 may operate as described below. Firstly, the determination unit 206 determines the difference between the maximum and minimum of the inputted CQI as depicted in FIG. 7. Then, if the determination unit determines that the difference is due to the effect of filters by comparing the difference with a specific threshold, the difference being less than the specific threshold value, the determination unit 206 does not determine to increase the number of reference signals. Meanwhile, if the determination unit determines that the difference is due to the effect of filters by comparing the difference with a specific threshold value, the difference being equal to or higher than the specific threshold value, the determination unit 206 determines to increase the number of reference signals. In this way, the determination unit 206 determines that the number of reference signals is to be increased if the reception quality is expected to improve with the increased number of reference signals. The determination unit 206 determines that the number of reference signals is to be increased if the CQI is degraded due to the effect of filter characteristics.

The determination unit 206 may determine whether the number of reference signals is to be increased based on both of the inputted SIR and CQI.

Once the determination unit 206 determines that the number of reference signals to be included in downlink signals is to be increased, the determination unit 206 may determine that the number of reference signals is to be reduced, that is, the number of number of reference signals is to be restored. The determination unit 206 may determine that the number of reference signals is to be restored, for example, in the case in which the reception quality has been improved at the mobile station apparatus 100n, and consequently the increase of reference signals in number is not necessary. In particular, the determination unit 206 may determine whether to increase the number of reference signals to be included in downlink signals, based on the inputted SIR and/or CQI. In this case, if the determination unit 206 determines that the increase of reference signals in number is not necessary by comparing the inputted SIR and/or CQI with corresponding specific threshold values, the inputted SIR and/or CQI being equal to or higher than the corresponding specific threshold values, the determination unit 206 may determine to restore the number of reference signals to be included in downlink signals. The determination unit 206 may determine whether the reference signals are to be increased in number, for example, based on the number of repeated transmission of downlink signal. In this case, if the determination unit 206 determines that the increase of reference signals in number is not necessary by comparing the number of repeated transmission of downlink signals with a specific threshold value, the number of repeated transmission being lower than the specific threshold, the determination unit 206 may determine to restore the number of reference signals. In response to the determination that the number of reference signals is to be restored, the determination unit 206 sends, to a reference signal generation unit 208, information indicating the restoration of the number of reference signals.

The base station apparatus 200 according to the present exemplary embodiment includes the reference signal generation unit 208. The reference signal generation unit 208 is configured to generate reference signals to be included in downlink signals. In response to the reception of the information indicating the increase of reference signals from the determination unit 206, the reference signal generation unit 208 increases the number of reference signals to be generated (generates more reference signals than it generated before the increase). In response to the reception of the information indicating the restoration of reference signals from the determination unit 206, the reference signal generation unit 208 restores the number of reference signals to be generated (generates as many reference signals as it generated before the increase). The reference signal generation unit 208 sends the generated reference signals to a mapping unit 210.

Figure 8:
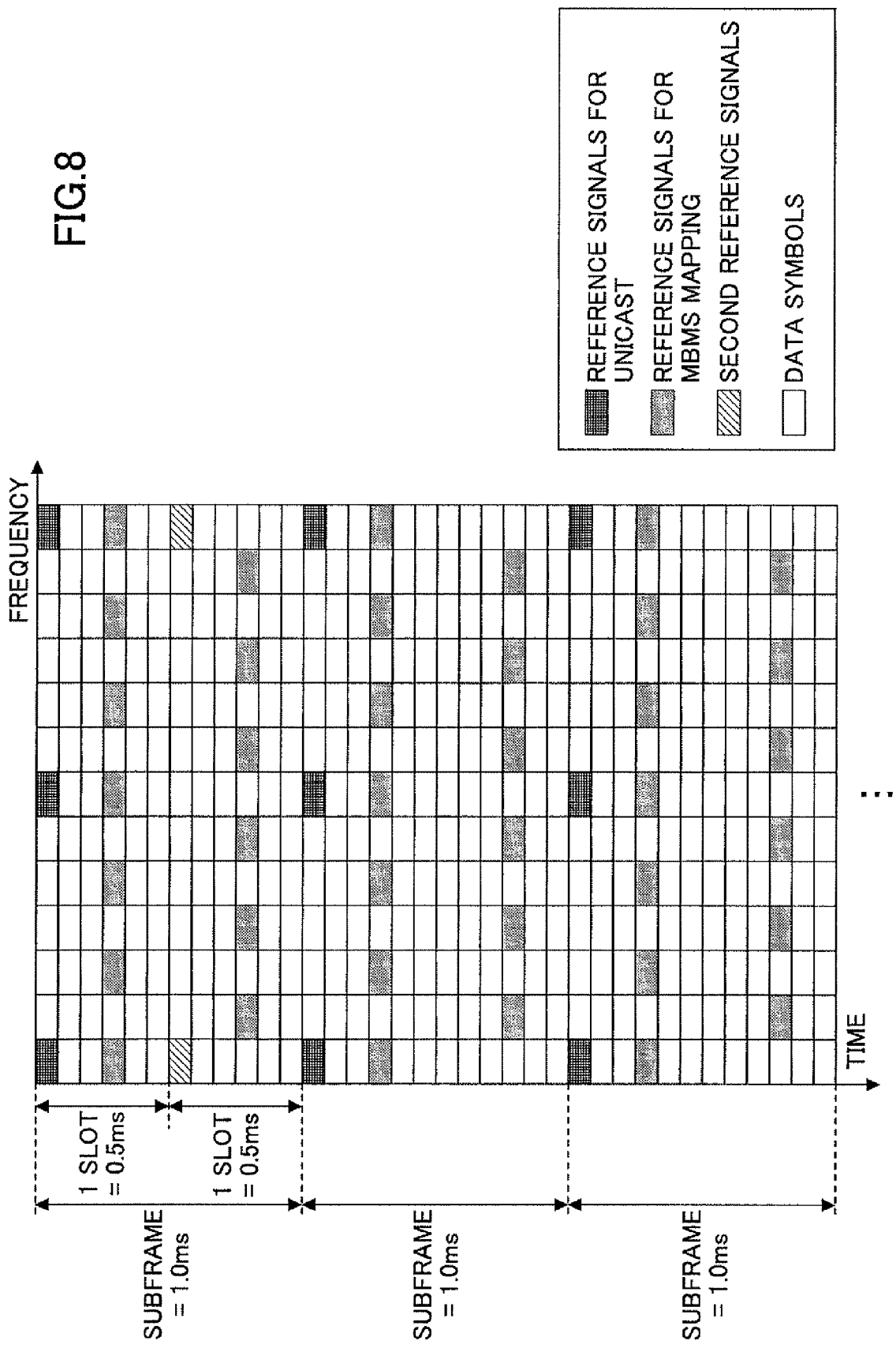
FIG. 8 is a schematic diagram illustrating exemplary mapping of reference signals according to an embodiment.

The base station apparatus 200 according to the present exemplary embodiment further includes the mapping unit 210. The mapping unit 210 receives the reference signals from the reference signal generation unit 208 and data. The mapping unit 210 maps the input reference signals and data. As an example, if the determination unit 206 determines that the number of reference signals is to be increased, the mapping unit 210 may map, in addition to reference signals mapped to (each first slot in) each subframe with six-subcarrier interval, additional reference signals to the second slot in the first subframe (in one radio frame), as illustrated in FIG. 8. The additional reference signals are illustrated as the second reference signals in FIG. 8. The additional reference signals may be preferably mapped to radio resources including subcarriers at the edge of a signal band of the mobile station 100n in order to mitigate the degradation of modulation accuracy at the edge of the signal band. In this disclosure, the signal band refers to the frequency band which the mobile station 100n can receive. For example, the frequency band which the mobile station 100n can receive may be variable step-wise from 1.4 MHz to 20 MHz in dependence on the performance of the mobile station 100n. This frequency band may be referred to as a system band. The mapping described above with reference to FIG. 8 is merely an example and not limiting.

Figure 1:
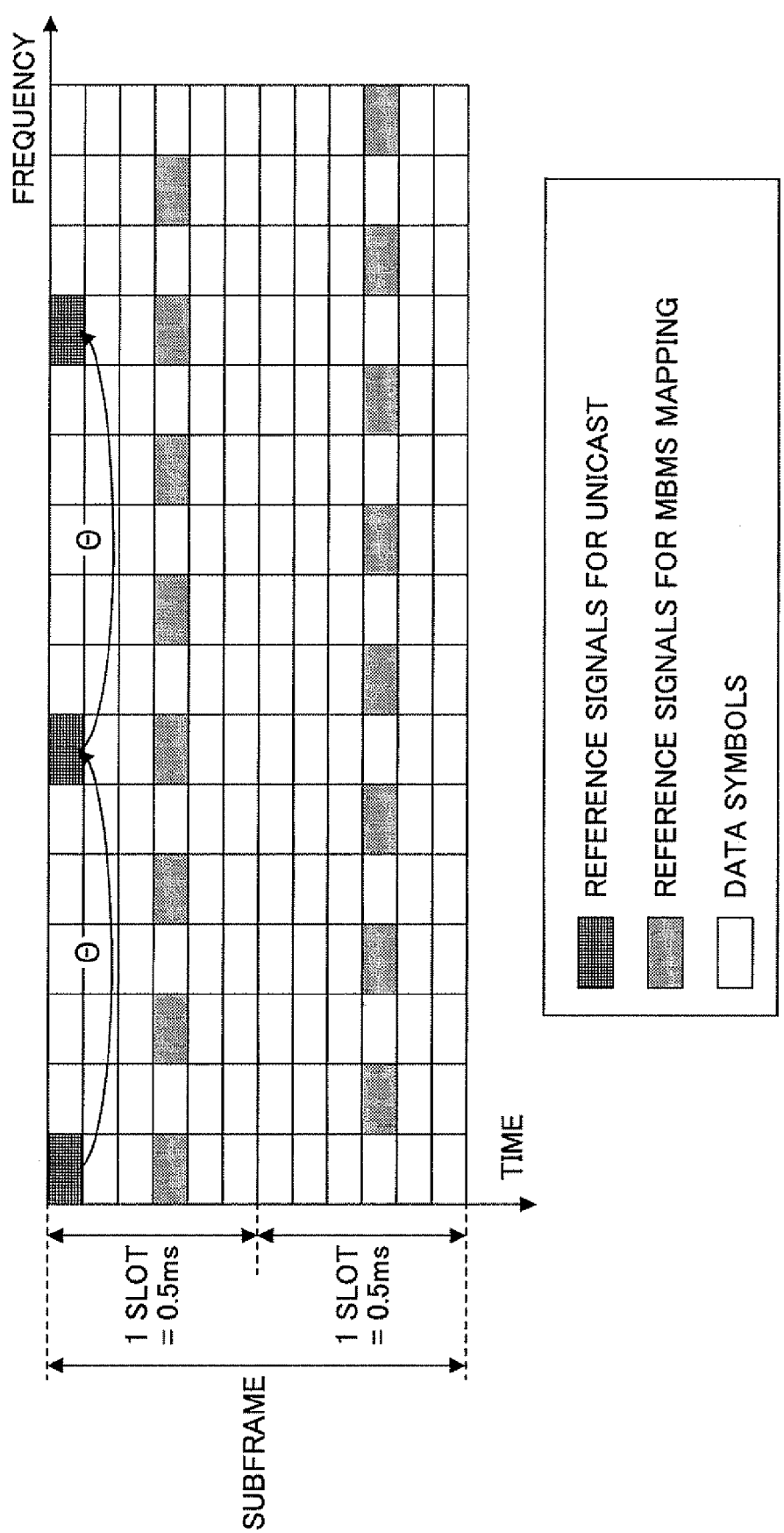
FIG. 1 is a schematic diagram illustrating exemplary mapping of a downlink signal.
Figure 2:
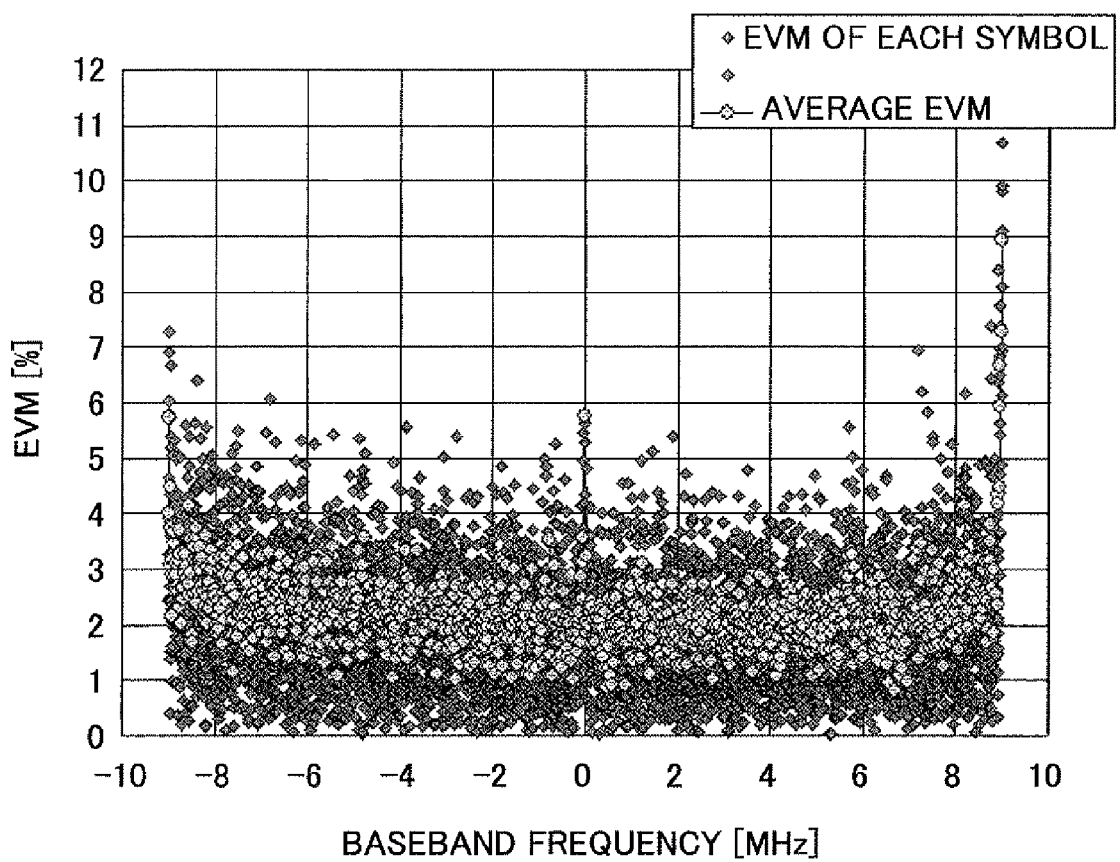
FIG. 2 is a plot indicating the relation between baseband frequency and modulation accuracy.
Figure 3:
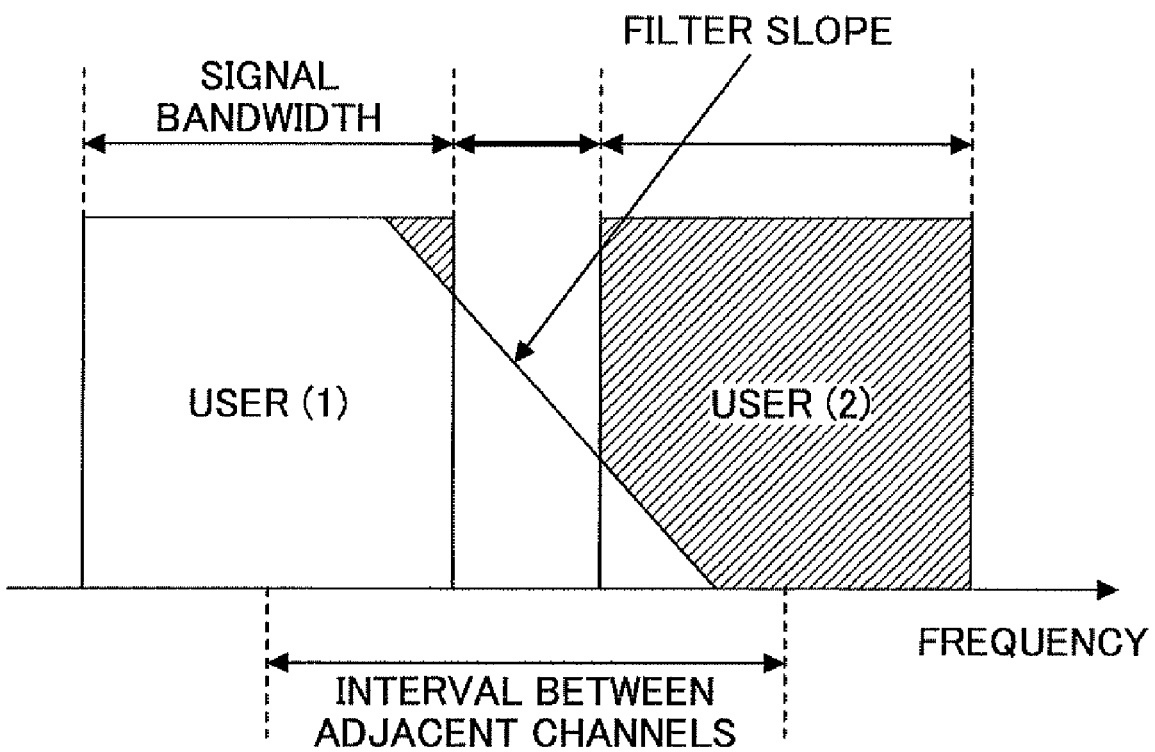
FIG. 3 is a schematic diagram illustrating exemplary filter characteristics.

In addition, if the determination unit 206 does not determine that the number of reference signals is to be increased, the reference signals may be mapped, for example, in each subframe with 6-subcarrier interval, as described with reference to FIG. 1.

Figure 9:
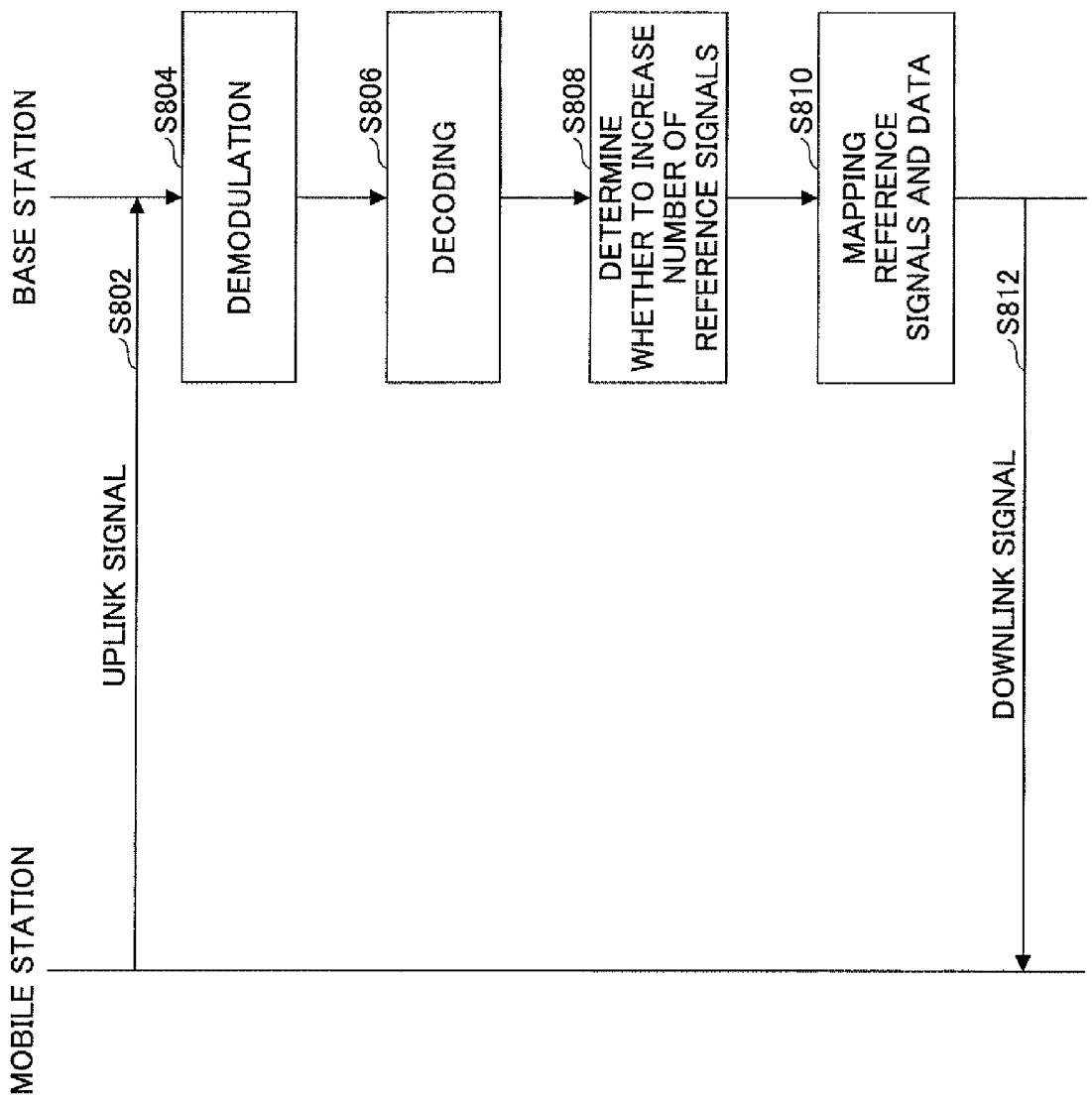
FIG. 9 is a flow diagram illustrating the operation of an exemplary wireless communication system according to an embodiment.

Referring now to FIG. 9, the operation of a wireless communication system in accordance with the embodiment is described.

The mobile station 100n transmits uplink signals (step S802). The uplink signal may include the SIR and/or CQI of downlink signals measured or derived at the mobile station 100n.

The base station 200 receives and demodulate the uplink signals transmitted by the mobile station 100n (step S804).

The base station 200 then decodes the demodulated uplink signals (step S806). The base station 200 may decode the demodulated uplink signals based on the reference signals included in the uplink signals transmitted from the mobile station 100.

The base station 200 determines whether the reference signals to be included in the downlink signals are to be increased in number. The base station 200 may determine whether to increase the number of reference signals based on the SIR and/or CQI of downlink signal from the mobile station 100n. The base station 200 may determines whether the reference signals are to be increased in number, for example, based on the number of repeated transmission of downlink signal.

The base station 200 maps the reference signals and data to radio resource (step S810). As an example, if the base station 200 determines that the number of reference signals is to be increased, the base station 200 may map, in addition to reference signals mapped to (each first slot in) each subframe with six-subcarrier interval, additional reference signals to the second slot in the first subframe (in one radio frame), as illustrated in FIG. 8. The additional reference signals may be preferably mapped to radio resources including subcarriers at the edge of a signal band of the mobile station 100n in order to mitigate the degradation of modulation accuracy at the edge of the signal band. In this disclosure, the signal band refers to the frequency band which the mobile station 100n can receive. For example, the frequency band which the mobile station 100n can receive may be variable step-wise from 1.4 MHz to 20 MHz in dependence on the performance of the mobile station 100n. This frequency band may be referred to as a system band. In addition, if the base station 200 determines that the number of reference signals is not to be increased, the reference signals may be mapped, for example, in each subframe with 6-subcarrier interval, as described with reference to FIG. 1.

The base station 200 transmits downlink signals (step S812).

According to the present embodiment, a base station can increase the number of reference signals to be mapped to a downlink signal based on the quality of communication with a mobile station. If the base station determines to increase the number of reference signals, the base station may map additional reference signals in a band portion including the edge of signal band which the mobile station can receive. In this disclosure, the signal band refers to the frequency band which the mobile station can receive. The base station may map the additional reference signals, for example, to subcarriers at the edge of frequency band which the mobile station can receive, or to resource blocks including the edge of frequency band which the mobile station can receive. In this disclosure, the term "resource block" refers to multiple subcarriers. Thus, the present embodiment can mitigate the degradation of reception performance due to baseband filters in the mobile station. This is because the more reference signals is mapped, the more accurate the channel estimation becomes. In particular, according to the present embodiment, the reception performance at the edge of frequency band which the mobile station can receive is improved. For example, the frequency band which the mobile station can receive may be variable stepwise from 1.4 MHz to 20 MHz in dependence on the performance of the mobile station. The wider the frequency band which the mobile station can receive, the more the reception performance at the edge of the frequency band is degraded. In particular, the degradation is notable with a frequency band higher than 10 MHz.

In addition, according to the present embodiment, the base station may restore the number of reference signals if, after the increase of reference signals, the reception performance improves to reduce or eliminate the necessity of the increased reference signals. The increase of reference signals to be mapped improves the accuracy of channel estimation, but reduces the number of data which can be mapped. In this way, the reduction of transmission rate can be minimized which is caused by the increase in the number of reference signals to be mapped.

The present embodiment may solve such a problem that the reception performance at the edge of frequency band which the mobile station can receive may be alleviated. As a result, the present embodiment may reduce the effect of filter characteristics of the mobile station on the determination of communication condition between the base station and the mobile station.

[Second Exemplary Embodiment]

An exemplary mobile communication system in which a wireless communication apparatus according to a second exemplary embodiment may be used is one described with reference to FIG. 4. The wireless communication apparatus may be included in a base station. Alternatively, the wireless communication apparatus may be included in a mobile station.

For the mobile communication system according to the present embodiment, the mobile station apparatus 100n determines whether to increase the number of reference signal to be included in downlink signals. If the mobile station 100n determines to increase the number of reference signals, it request the base station 200 to increase the number of reference signals.

Figure 10:
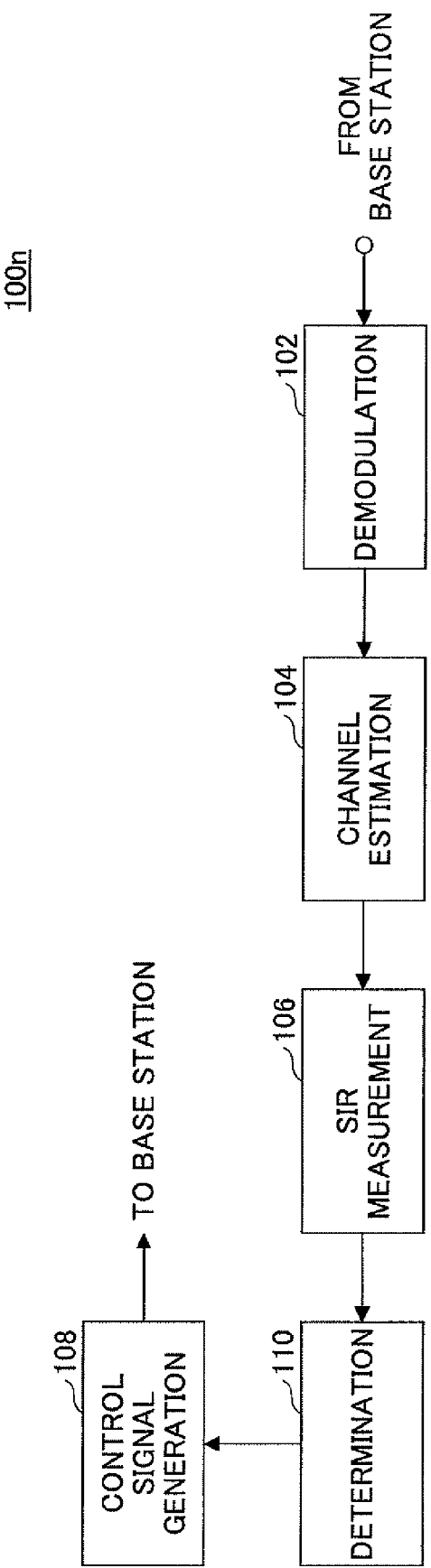
FIG. 10 is a block diagram illustrating an exemplary mobile station according to an embodiment.

Referring now to FIG. 10, an exemplary mobile station apparatus 100n is described.

The mobile station apparatus 100n according to the present exemplary embodiment includes a demodulation unit 102. The demodulation unit 102 demodulates downlink signals from the base station (eNB) 200. The demodulation unit 102 inputs the demodulated downlink signals into a channel estimation unit 104.

The mobile station apparatus 100n according to the present exemplary embodiment further includes the channel estimation unit 104. The channel estimation unit 104 uses the demodulated downlink signals from the demodulation unit 102 to perform channel estimation. The channel estimation unit 104 may use, for example, reference signals included in the demodulated downlink signals to perform channel estimation. The mobile station 100n decodes the signal in dependence on the channel estimation. The channel estimation unit 104 sends the demodulated downlink signals to a Signal-to-Interference-Ratio (SIR) measurement unit 106, which is described in more details below.

The channel estimation unit 104 may retain a channel estimation value estimated using increased reference signals. In the case in which the channel estimation is made on a subframe using non-increased reference signals, the channel estimation unit 104 may use the retained channel estimation value. A subframe with increased reference signals may reduce data that can be mapped to the subframe. Another subframe with non-increased reference signals does not reduce data that can be mapped to the other subframe. The other subframe with non-increased reference signals can use the retained channel estimation value, which prevents transmission rate to be reduced and allows increased reception characteristics.

The mobile station apparatus 100n according to the present exemplary embodiment further includes a Signal-to-Interference-Ratio (SIR) measurement unit 106. The SIR measurement unit 106 measures downlink signal quality. The SIR measurement unit 106 may use the reference signals included in the downlink signals to measure the reception quality. The SIR measurement unit 106 sends the measured Signal to Interference Ratio (SIR) to a determination unit 110, which is described in more detail below. The SIR measurement unit 106 may derive CQI based on the measured SIR. In this case, the SIR measurement unit 106 may send the derived CQI, instead of the measured SIR, to the determination unit 110.

The mobile station apparatus 100n according to the present exemplary embodiment further includes the determination unit 110. The determination unit 110 determines whether to increase the number of reference signals to be included in downlink signals based on the received SIR. The determination unit 110 may determine whether to increase the number of reference signals to be included in downlink signals based on the received CQI.

If the determination unit 110 determines that the reception quality would not improve with the increased number of reference signals by comparing the inputted SIR with a specific threshold value, the inputted SIR being lower than the specific threshold value, the determination unit 110 may determine not to increase the number of reference signals. Additionally or alternatively, if the determination unit 110 determines that the reception quality would not improve with the increased number of reference signals by comparing the inputted CQI with a specific threshold value, the inputted CQI being lower than the specific threshold value, the determination unit 110 may determine not to increase the number of reference signals.

Figure 11:
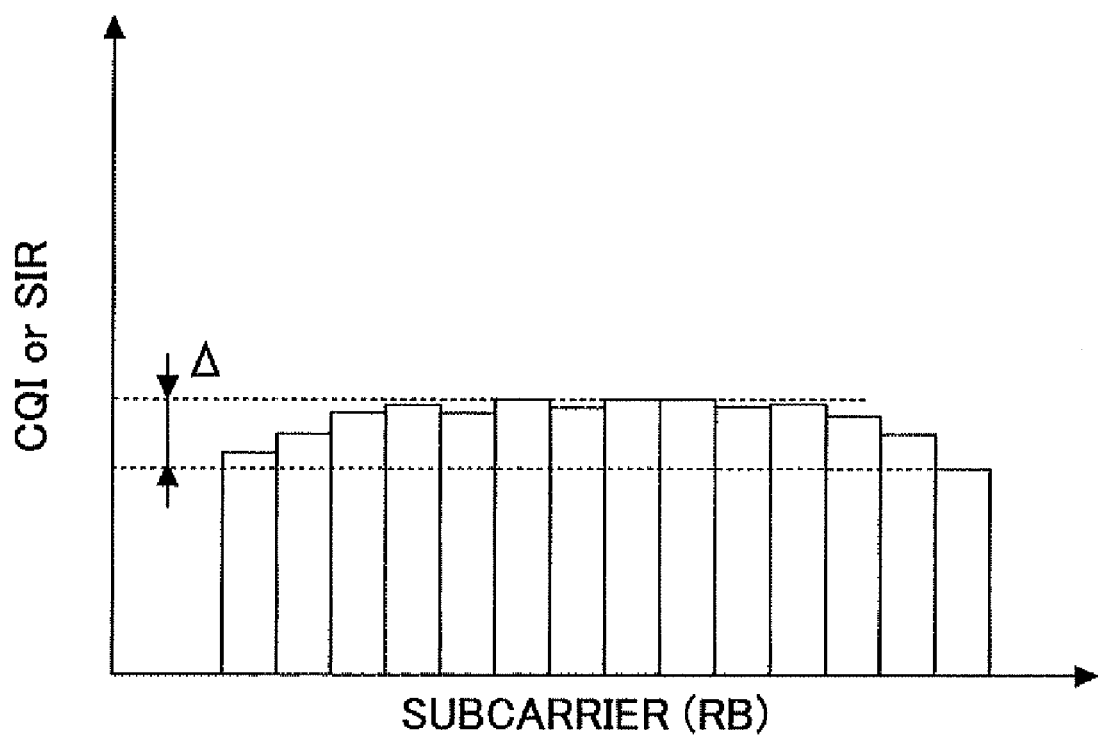
FIG. 11 is a schematic diagram illustrating the operation an exemplary mobile station according to an embodiment.

If the determination unit 110 determines that the reception quality would improve with the increased number of reference signals by comparing the inputted SIR with a specific threshold value, the inputted SIR being equal to or higher than the specific threshold value, the determination unit 110 may determine to perform the following operation. The determination unit 110 determines the difference (delta) between the maximum and minimum of the inputted SIR as depicted in FIG. 11. Then, if the determination unit 110 determines that the difference is due to the effect of filters by comparing the difference with a specific threshold value, the difference being less than the specific threshold value, the determination unit 110 determines not to increase the number of reference signals. Meanwhile, if the determination unit 110 determines that the difference is due to the effect of filters by comparing the difference with a specific threshold value, the difference being equal to or higher than the specific threshold value, the determination unit 110 determines to increase the number of reference signals. In this way, the determination unit 110 determines that the number of reference signals is to be increased if the reception quality is expected to improve with the increased number of reference signals. The determination unit 110 may determine that the number of reference signals is to be increased if the SIR is degraded due to the effect of filter characteristics.

If the determination unit 110 determines that the reception quality would improve with the increased number of reference signals by comparing the inputted CQI with a specific threshold, the inputted CQI being equal to or higher than the specific threshold value, the determination unit 110 may operate as described below. Firstly, the determination unit 110 determines the difference between the maximum and minimum of the inputted CQI as depicted in FIG. 11. Then, if the determination unit 110 determines that the difference is due to the effect of filters by comparing the difference with a specific threshold value, the difference being less than the specific threshold value, the determination unit 110 determines not to increase the number of reference signals. Meanwhile, if the determination unit 110 determines that the difference is due to the effect of filters by comparing the difference with a specific threshold value, the difference being equal to or higher than the specific threshold value, the determination unit 110 determines to increase the number of reference signals. In this way, the determination unit 110 determines that the number of reference signals is to be increased if the reception quality is expected to improve with the increased number of reference signals. The determination unit 206 determines that the number of reference signals is to be increased if the CQI is degraded due to the effect of filter characteristics. The determination unit 110 sends its determination to increase the number of reference signals to a control signal generation unit 108.

The determination unit 110 may determine whether to increase the number of reference signals based on both the inputted SIR and CQI.

Once the determination unit 110 determines to increase the number of reference signals to be included in downlink signals, the determination unit 110 may determine whether to reduce the number of reference signals, that is, whether to restore the number of reference signals. The determination unit 110 may determine to restore the number of reference signals, for example, in the case in which the reception quality has been improved at the mobile station apparatus 100n, and consequently the increase of reference signals in number is not necessary. In particular, the determination unit 110 may determine whether to increase the number of reference signals to be included in downlink signals, based on the inputted SIR and/or CQI. In this case, if the determination unit 110 determines that the increase of reference signals in number is not necessary by comparing the inputted SIR and/or CQI with corresponding specific threshold values, the inputted SIR and/or CQI being equal to or higher than the corresponding specific threshold values, the determination unit 110 may determine to restore the number of reference signals to be included in downlink signals. In response to the determination to restore the number of reference signals, the determination unit 110 sends, to the control signal generation unit 108, information to restore the number of reference signals.

The mobile station apparatus 100n according to the present exemplary embodiment further includes the control signal generation unit 108. The control signal generation unit 108 generates a control signal including the inputted information to increase the number of reference signals. Then, the control signal generation unit 108 transmits the generated control signal to the base station (eNB) 200. In addition, the control signal generation unit 108 generates a control signal including the inputted information to restore the number of reference signals. For example, the control signal generation unit 108 may generate a request for increased number of reference signals as illustrated in FIG. 12. For example, the request for increased number of reference signals may be 1-bit information. For example, the 1-bit information being "0" indicates the determination not to increase the number of reference signals; the 1-bit information being "1" indicates the determination to increase the number of reference signals. Then, the control signal generation unit 108 transmits the generated control signal to the base station (eNB) 200.

Figure 13:
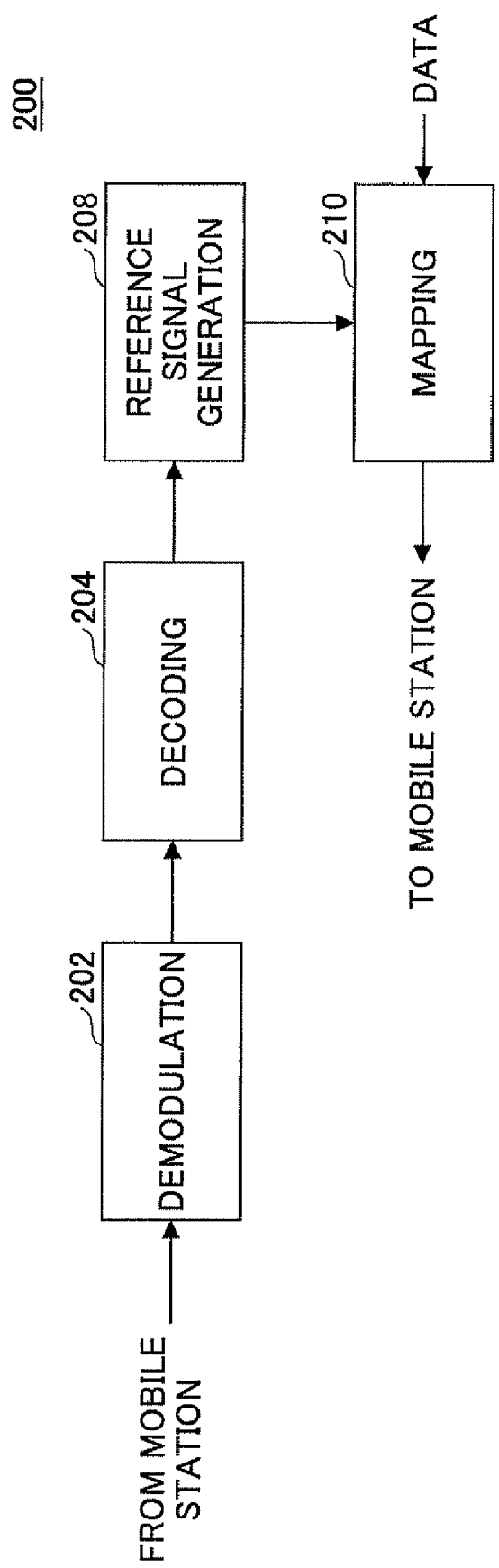
FIG. 13 is a block diagram illustrating an exemplary base station according to an embodiment.

Referring now to FIG. 13, an exemplary base station apparatus is described.

The base station apparatus 200 according to the present exemplary embodiment includes a demodulation unit 202. The demodulation unit 202 receives uplink signals transmitted from the mobile station 100n. The demodulation unit 202 demodulates the uplink signals inputted thereto. The uplink signals include the control signal. The demodulation unit 202 inputs the demodulated uplink signals into a decoding unit 204.

The base station apparatus 200 according to the present exemplary embodiment further includes the decoding unit 204. The decoding unit 204 decodes the demodulated uplink signals inputted from the demodulation unit 202. The decoding unit 204 may decode, for example, a control signal. The control signal may include information to increase the number of reference signals. The control signal may include information to restore the number of reference signals. The decoding unit 204 inputs the decoded uplink signals into a reference signal generation unit 208.

The base station apparatus 200 according to the present exemplary embodiment includes the reference signal generation unit 208. The reference signal generation unit 208 is configured to generate reference signals to be included in downlink signals. In response to the reception of the information to increase the number of reference signals from the determination unit 206, the reference signal generation unit 204 increases the number of reference signals to be generated (generates the increased number of reference signals). In response to the reception of the information to restore the number of reference signals from the decoding unit 204, the reference signal generation unit 208 restores the number of reference signals to be generated (generates as many reference signals as it generated before the increase). The reference signal generation unit 208 sends the generated reference signals to a mapping unit 210.

The base station apparatus 200 according to the present exemplary embodiment further includes the mapping unit 210. The mapping unit 210 receives the reference signals from the reference signal generation unit 208 and data. The mapping unit 210 maps the input reference signals and data. As an example, if the mobile station 100n transmits the information to increase the number of reference signals, the mapping unit 210 may map, in addition to reference signals mapped to (each first slot in) each subframe with six-subcarrier interval, additional reference signals to the second slot in the first subframe (in one radio frame), as illustrated in FIG. 8. The additional reference signals may be preferably mapped to radio resources including subcarriers at the edge of a signal band of the mobile station 100n in order to mitigate the degradation of modulation accuracy at the edge of the signal band. In this disclosure, the signal band refers to the frequency band which the mobile station can receive. For example, the frequency band which the mobile station can receive may be variable step-wise from 1.4 MHz to 20 MHz in dependence on the performance of the mobile station. This frequency band may be referred to as a system band. The mapping described above with reference to FIG. 8 is merely an example and not limiting.

In addition, if the mobile station 100n does not transmit information to increase the number of reference signals, the reference signals may be mapped, for example, in each subframe with 6-subcarrier interval, as described with reference to FIG. 1.

Referring now to FIG. 14, the operation of a wireless communication system in accordance with the embodiment is described.

The base station 200 transmits downlink signals (step S1302).

The mobile station 100n receives and demodulates the downlink signals transmitted by the base station 200 (step S1304).

The mobile station 100n measures SIR based on the modulated downlink signal (step S1306). For example, the mobile station 100n may measure SIR based on the reference signals included in the downlink signals transmitted from the base station 200. Additionally or alternatively, the mobile station 100n may derive CQI based on the SIR measured based on the reference signals included in the downlink signals transmitted from the base station 200.

The base station 100n determines whether to increase the number of reference signals to be included in the downlink signals (step S1308). If the mobile station 100n has increased the number of reference signals, the mobile station 100n may determine whether to restore the number of reference signals. For example, the mobile station 100n may make a determination based on the measured SIR. In addition, for example, the mobile station 100n may make a determination based on the derived CQI.

The mobile station 100n transmits an uplink signal (step S1310). The uplink signal may include control information indicating the increase in the number of reference signals. The uplink signal may include control information indicating the restoration of the number of reference signals.

The base station 200 receives and demodulate the uplink signal transmitted by the mobile station 100n (step S1312).

The base station 200 then decodes the demodulated uplink signal (step S1314).

The base station 200 maps reference signals and data in the radio resource based on the control information indicating whether to increase the number of reference signals included in the uplink signal (step S1316). As an example, if the base station 200 is to increase the number of reference signals, the base station 200 may map, in addition to reference signals mapped to (each first slot in) each subframe with six-subcarrier interval, additional reference signals to the second slot in the first subframe (in one radio frame), as illustrated in FIG. 8. The additional reference signals may be preferably mapped to radio resources including subcarriers at the edge of a signal band of the mobile station 100n in order to mitigate the degradation of modulation accuracy at the edge of the signal band. In this disclosure, the signal band refers to the frequency band which the mobile station can receive. For example, the frequency band which the mobile station can receive may be variable step-wise from 1.4 MHz to 20 MHz in dependence on the performance of the mobile station. This frequency band may be referred to as a system band. In addition, if the base station 200 is to restore the number of reference signals, the base station 200 may map the reference signals, for example, in each subframe with 6-subcarrier interval, as described with reference to FIG. 1. In addition, if the base station 200 is not to increase the number of reference signals, the base station 200 may map the reference signals, for example, in each subframe with 6-subcarrier interval, as described with reference to FIG. 1.

The base station 200 then transmits a downlink signal (step S1308).

According to the present embodiment, a base station can increase the number of reference signals to be mapped to a downlink signal based on the quality of communication with a mobile station. For example, if the mobile station detects the degradation of reception quality, the mobile station can request the base station to increase the number of reference signals. If the base station is to increase the number of reference signals, the base station may map additional reference signals in a frequency band portion including the edge of frequency band which the mobile station can receive. The base station may map the additional reference signals, for example, to subcarriers at the edge of frequency band which the mobile station can receive, or to resource blocks including the edge of frequency band which the mobile station can receive. In this disclosure, the term "resource block" refers to multiple subcarriers.

Thus, the present embodiment can mitigate the degradation of reception performance due to baseband filters in the mobile station. This is because the more reference signals is mapped, the more accurate the channel estimation becomes. In particular, according to the present embodiment, the reception performance at the edge of frequency band which the mobile station can receive is improved. For example, the frequency band which the mobile station can receive may be variable step-wise from 1.4 MHz to 20 MHz in dependence on the performance of the mobile station. The wider the frequency band which the mobile station can receive, the more the reception performance at the edge of the frequency band is degraded. In particular, the degradation is notable with a frequency band higher than 10 MHz.

In addition, according to the present embodiment, the mobile station may request the base station to restore the number of reference signals if, after the increase of reference signals, the reception performance improves enough to reduce or eliminate the necessity of the increased reference signals. The increase in the number of reference signals to be mapped improves the accuracy of channel estimation, but reduces the number of data which can be mapped. In this way, the reduction of transmission rate can be minimized which is caused by the increase in the number of reference signals to be mapped.

The present embodiment may solve such a problem that the reception performance at the edge of frequency band which the mobile station can receive may be alleviated. As a result, the present embodiment may reduce the effect of filter characteristics of the mobile station on the determination of communication condition between the base station and the mobile station.

The invention claimed is:

1. A wireless communication apparatus, comprising: a determination unit configured to determine whether to increase the number of reference signals to be included in a downlink signal based on an uplink signal; and a mapping unit configured to map reference signals based on a determination made by the determination unit; wherein the mapping units maps the increased number of reference signals to radio resource including an edge of frequency band which another wireless communication apparatus that receives the downlink signal is configured to receive.

2. The wireless communication apparatus as claimed in claim 1,
wherein the uplink signal includes information indicating downlink channel condition.

3. The wireless communication apparatus as claimed in claim 2,
wherein the determination unit determines to increase the number of reference signals based on reception performance at an edge of frequency band in which the downlink signal is transmitted.

4. A wireless communication apparatus, comprising:
a determination unit configured to determine whether to increase the number of reference signals to be included in a downlink signal based on an uplink signal; and
a mapping unit configured to map reference signals based on a determination made by the determination unit,
wherein the mapping unit maps the increased number of reference signals to radio resource including an edge of frequency band in which the downlink signal is transmitted.

5. A wireless communication apparatus, comprising: a determination unit configured to determine whether to increase the number of reference signals to be included in a downlink signal based on the downlink signal; and an informing unit configured to inform a determination made by the determination unit; wherein the determination unit determines whether to increase the number of reference signals to be included in the downlink signal based on Signal to Interference Ratio (SIR) and/or information indicating channel condition of the downlink signal.

6. A wireless communication apparatus, comprising:
a determination unit configured to determine whether to increase the number of reference signals to be included in a downlink signal based on the downlink signal; and
an informing unit configured to inform a determination made by the determination unit,
wherein the determination is configured to determine whether the reception quality improves with the increased number of reference signals by comparing a Signal to Interference Ratio (SIR) and/or channel condition of the downlink signal with corresponding threshold values, and to determine to not increase the number of reference signals if the SIR and/or the channel condition is lower than the corresponding threshold values.

7. A wireless communication apparatus, comprising:
a determination unit configured to determine whether to increase the number of reference signals to be included in a downlink signal based on the downlink signal; and
an informing unit configured to inform a determination made by the determination unit,
wherein the determination unit is configured to determine whether the reception performance improves with the increased number of reference signals by comparing a Signal to Interference Ratio (SIR) and/or channel condition of the downlink signal with corresponding threshold values, and to determine whether to increase the number of reference signals based on a difference between a maximum and a minimum of the SIR and/or the channel condition if the SIR and/or the channel condition is equal to or higher than the corresponding threshold values.

8. The wireless communication apparatus as claimed in claim 7,
wherein, if the determination unit determines that the difference is not due to an effect of filters by comparison of the difference with a threshold value, the determination unit does not determine that the number of reference signals is to be increased.

9. The wireless communication apparatus as claimed in claim 7,
wherein, if the determination unit determines that the difference is due to an effect of filters by comparison of the difference with a threshold value, the determination unit determines that the number of reference signals is to be increased.

10. A wireless communication apparatus, comprising:
a determination unit configured to determine whether to increase the number of reference signals to be included in a downlink signal based on the downlink signal;
an informing unit configured to inform a determination made by the determination unit;
a channel estimation unit configured to perform channel estimation based on the reference signals; and
a retaining unit configured to retain the result of the channel estimation;
wherein the channel estimation unit uses a channel estimation value for a subframe with the increased number of reference signals as a channel estimation value for another subframe without the increased number of reference signals.

11. A method performed by a wireless communication apparatus, the method comprising: determining, by the wireless communication apparatus, whether to increase the number of reference signals to be included in a downlink signal based on an uplink signal; and mapping reference signals based on the determination; wherein the mapping units maps the increased number of reference signals to radio resource including an edge of frequency band which another wireless communication apparatus that receives the downlink signal is configured to receive.

* * * * *